US009582599B2

(12) United States Patent
Green

(10) Patent No.: US 9,582,599 B2
(45) Date of Patent: *Feb. 28, 2017

(54) UPDATING THE DISPLAY OF A PAGE WITH DATA

(75) Inventor: Nigel Green, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 819 days.

This patent is subject to a terminal disclaimer.

(21) Appl. No.: 13/335,788

(22) Filed: Dec. 22, 2011

(65) Prior Publication Data
US 2012/0110435 A1  May 3, 2012

Related U.S. Application Data

(62) Division of application No. 10/720,712, filed on Nov. 24, 2003, now Pat. No. 8,103,742.

(51) Int. Cl.
G06F 17/00 (2006.01)
G06F 17/30 (2006.01)

(52) U.S. Cl.
CPC .............. *G06F 17/30893* (2013.01)

(58) Field of Classification Search
CPC ................................. G06F 17/30899
USPC ....................................... 715/234
See application file for complete search history.

(56) References Cited

U.S. PATENT DOCUMENTS

| 5,208,905 A * | 5/1993 | Takakura ............... G06T 11/60 715/219 |
| 5,625,823 A | 4/1997 | Debenedictis et al. |
| 5,737,619 A * | 4/1998 | Judson ......................... 715/236 |
| 5,987,466 A | 11/1999 | Greer et al. |
| 5,995,101 A | 11/1999 | Clark et al. |
| 6,023,724 A | 2/2000 | Bhatia et al. |
| 6,119,108 A | 9/2000 | Holmes et al. |
| 6,182,133 B1 * | 1/2001 | Horvitz ........................ 709/223 |
| 6,298,446 B1 | 10/2001 | Schreiber et al. |
| 6,314,451 B1 | 11/2001 | Landsman et al. |
| 6,484,150 B1 | 11/2002 | Blinn et al. |
| 6,563,514 B1 * | 5/2003 | Samar ......................... 715/711 |
| 6,584,498 B2 * | 6/2003 | Nguyen ....................... 709/219 |
| 6,622,168 B1 * | 9/2003 | Datta ........................... 709/219 |

(Continued)

OTHER PUBLICATIONS

"JavaScript & DHTML Cookbook" by Danny Goodman; O'Reilly & Associates, dated Apr. 2003, pp. 421-423 (ISBN 0-596-00467-2) (of-record in the parent application).

(Continued)

*Primary Examiner* — Mustafa Amin
(74) *Attorney, Agent, or Firm* — Knobbe, Martens, Olson & Bear, LLP

(57) ABSTRACT

A page update handler enables a browser to update the display of a page with data received from a server. For example, a server may predictively retrieve data in anticipation of a user performing a particular action on a page, and may send this data to the browser in a hidden format; if the user subsequently performs the action, the page update handler may update the displayed page with the predictively retrieved data. As another example, a page may initially be displayed with a visual display object that serves as a placeholder for data being retrieved by the server; once the server retrieves the data and sends it to the browser, the page update hander may populate the display object with the data.

22 Claims, 7 Drawing Sheets

(56) References Cited

U.S. PATENT DOCUMENTS

| | | | |
|---|---|---|---|
| 6,732,331 | B1 | 5/2004 | Alexander |
| 6,789,075 | B1 * | 9/2004 | Nielsen |
| 7,051,084 | B1 | 5/2006 | Hayton et al. |
| 7,096,418 | B1 | 8/2006 | Singhal et al. |
| 7,100,123 | B1 | 8/2006 | Todd et al. |
| 7,155,528 | B2 | 12/2006 | Tam |
| 7,194,678 | B1 * | 3/2007 | Koike et al. ................. 715/234 |
| 7,296,230 | B2 | 11/2007 | Fukatsu et al. |
| 7,331,038 | B1 | 2/2008 | Snodgrass et al. |
| 7,346,842 | B1 * | 3/2008 | Hayton ............ G06F 17/30902 705/64 |
| 7,421,661 | B1 | 9/2008 | Canfield et al. |
| 7,581,008 | B2 * | 8/2009 | Zhang ................. H04L 67/1006 703/2 |
| 8,639,694 | B1 * | 1/2014 | Wolfe .......................... 707/736 |
| 2002/0002595 | A1 | 1/2002 | Blumenau |
| 2002/0046052 | A1 | 4/2002 | Brown et al. |
| 2002/0059327 | A1 | 5/2002 | Starkey |
| 2003/0040970 | A1 | 2/2003 | Miller |
| 2003/0050995 | A1 | 3/2003 | Mateos |
| 2003/0177445 | A1 * | 9/2003 | Sunata ......................... 715/513 |
| 2004/0039794 | A1 * | 2/2004 | Biby .................. H04L 12/1827 709/217 |
| 2004/0095400 | A1 * | 5/2004 | Anderson et al. ............ 345/864 |
| 2004/0205149 | A1 * | 10/2004 | Dillon et al. ................. 709/217 |
| 2004/0205514 | A1 * | 10/2004 | Sommerer et al. ........ 715/501.1 |
| 2004/0205555 | A1 * | 10/2004 | Hind ................. G06F 17/30873 715/205 |
| 2006/0069996 | A1 | 3/2006 | Greaves |

OTHER PUBLICATIONS

Z. Wang and J. Crowcroft, Department of Computer Science, University College London, "Prefetching in World Wide Web," Communications: The Key to Global Prosperity, Globecom 1996 Internet 96 Conference Record, London, pp. 28-32, dated Nov. 18, 1996 (XP-000741668) (of-record in the parent application).

"Exchanging information with a server without reloading your HTML page: Three techniques that can help you improve the efficiency of your Web application" by Tong Li, dated Jan. 1, 2002, downloaded from www-106.ibm.com/developerworks/web/librarylwa-exrel/?dwzone=web on Dec. 1, 2003 (8 pages) (of-record in the parent application).

"Working with Javascript—Remote Scripting with IFRAME," dated Mar. 2002, printed from http://developer.apple.com/internet/javascript/iframe.html on Dec. 1, 2003 (7 pages) (of-record in the parent application).

* cited by examiner

UPDATING THE DISPLAY OF A PAGE WITH DATA

PRIORITY CLAIM

This application is a division of U.S. application Ser. No. 10/720,712, filed Nov. 24, 2003 now U.S. Pat. No. 8,103,742, the disclosure of which is hereby incorporated by reference.

BACKGROUND OF THE INVENTION

Field of the Invention

The present invention relates to dynamic web page generation, and more specifically, relates to web server systems that generate web pages using data obtained from one or more services.

Description of the Related Art

The task of dynamically generating a requested electronic document, such as a web page, commonly involves the generation of service requests to one or more services. Typically, these services are implemented on server systems that are separate from the web server system that assembles or "renders" the web page for transmission to the browser. As the services respond to the service requests, the web server system incorporates the service data into the page, typically according to a template that specifies the page's layout. The rendered page is then transmitted to the requesting web browser for display.

One problem commonly encountered by web site designers is that some services tend to have relatively long response times, potentially resulting in long page load times from the perspective of end users. A service's response time may be long as the result of load conditions, network latency (especially if the service is remote), the quantity of computation required to generate the requested data, and other factors.

To address this problem, a web page may be designed such that the data requested from the relatively slow service is placed near the bottom of the requested page. With this approach, the web server can begin to transmit the requested web page to the user's computer before the relatively slow service returns its data, and then send the remainder of the page when the service request is complete. While this approach may reduce the page's perceived load time, it may be unacceptable to a web page designer who wishes to display the service data at a more prominent or relevant location on the page.

SUMMARY

A dynamic page generation system is disclosed that uses a page update handler to enable a browser to update the display of a page with data received from a server. For example, a server system may predictively retrieve data in anticipation of a user performing a particular action on a page, and may send this data to the browser in a hidden format; if the user subsequently performs the action, the page update handler may update the displayed page with the predictively retrieved data. As another example, a page may initially be displayed with a visual display object that serves as a placeholder for data being retrieved by the server; once the server retrieves the data and sends it to the browser, the page update hander may populate the display object with the data. The page update handler may, for example, be a JavaScript function that is embedded within the page or downloaded to the browser within a library file.

In some embodiments, the system defers the task of rendering a portion of a web page associated with late-arriving service data, and offloads this task to the page update handler. For example, when the server system receives a page request that involves a service request to a slow or potentially slow service, the server system may generate and serve a "deferred rendering" version of the page that initially lacks the data from this service, but which includes most or all of the other visual elements of the web page. Preferably, a placeholder for the service data, such as a display object that may be populated by the page update handler, is initially included within the deferred-rendering version of the page. This placeholder may be included at a prominent location, such as near the top of the visible page. When the service returns the requested data, the server system forwards this data to the web browser, which executes the associated page update handler to populate the page with the late-arriving service data. The page update handler may also perform related rendering tasks such as resizing the placeholder display object to accommodate the service data, or converting the service data into a tabular or other display format.

Neither this summary nor the following detailed description purports to define the invention. The invention is defined by the claims.

DETAILED DESCRIPTION OF THE PREFERRED EMBODIMENTS

Specific embodiments and example applications of the invention will now be described with reference to the drawings. These embodiments and example applications are intended to illustrate, and not limit, the present invention. The invention is defined by the claims.

I. Overview

Figure 1:
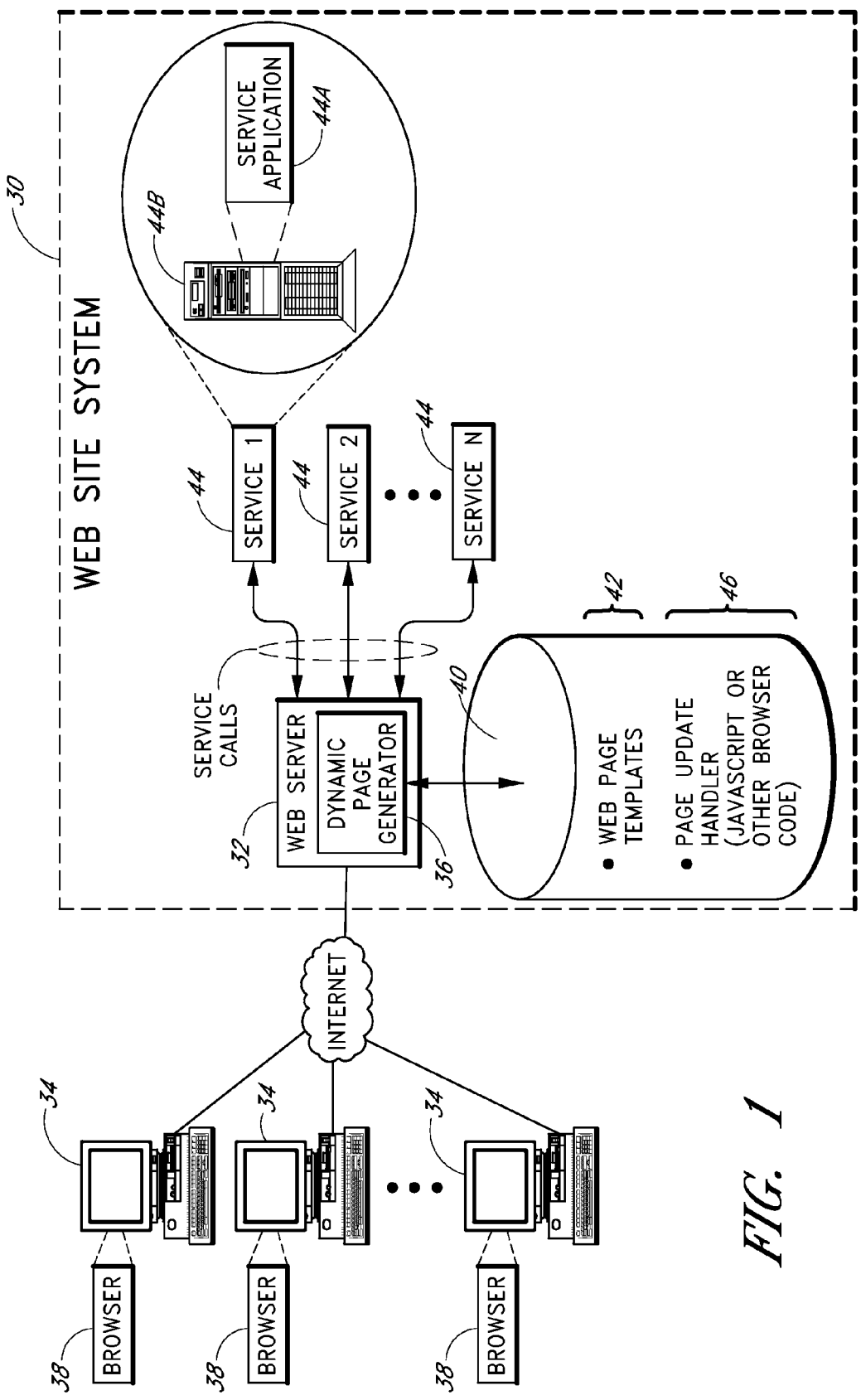
FIG. 1 illustrates a web site system according to one embodiment of the invention.

FIG. 1 illustrates a web site system 30 that implements a deferred-rendering web page generation process according to one embodiment of the invention. The system 30 includes a web server system 32 that responds to requests from user computers 34 by generating and returning web pages. The web server system 32 is composed of one or more physical servers that execute web server software, including a dynamic page generator program 36. Each user computer 34 runs a web browser program 38 ("web browser") 38, which may be any type of program (operating system component, standalone browser, document authoring tool, etc.) that provides web browsing functionality.

The dynamic page generator 36 generates web pages according to web page templates 42 stored in a database 40, as is known in the art. Many different templates 42 may be provided within a given system 30. When a page request is received by the web server 32, the dynamic page generator 36 retrieves and processes the corresponding template 42, which may be uniquely identified by the target URL (Uniform Resource Locator) specified by the page request. Typically, this template 42 will specify one or more service requests that are to be sent to specific services 44 to retrieve data for generating the requested page. For example, a given template may specify one service 44 request for retrieving the user's transaction history, and may call another service 44 that generates personalized item recommendations based on this transaction history. Although templates are used in the preferred embodiment, as will be recognized the invention may be implemented without the use of templates.

As depicted in FIG. 1 for one of the services 44, each service 44 is typically in the form of a service application 44A that runs on one or more physical servers 44B, although two or more different service applications 44A may run on the same physical server 44B in some cases. Many different services 44 may be provided within a given system 30. The types and functions of these services 44 may vary widely depending on the nature and purpose of the particular web site system 30 (e.g., Internet searching, business-to-consumer sales, access to online publications, job postings, online banking, etc.). The services 44 may, but need not, be implemented as web services.

Typically, some services 44 will have longer average response times than others. For example, a service implemented on a physical server 44B that is remote from the web server system 32 may tend to have relatively long response times due to network latency. Some services 44 may also have relatively long response times due to the quantity of computation required to process the service requests they receive. The response time of a given service 44 may also vary based on its current load, the complexity of the particular request, configuration settings, resource availability, and other factors.

As illustrated, the database 40 also stores at least one page update handler 46 that is transmitted to and executed by the web browsers 38 in connection with page load events. The general function of the page update handler 46 is to update a previously rendered portion of a web page to incorporate service data that was not available to the web server 32 when that portion of the page was generated. In a preferred embodiment illustrated in FIGS. 2-5, the page update handler 46 is executed by a browser 38 near the end of the page load event, as or just after the relevant service data arrives at the browser 38. In another embodiment which is depicted in FIG. 6, the page update handler 46 is invoked after the page is fully loaded.

Figure 3A:
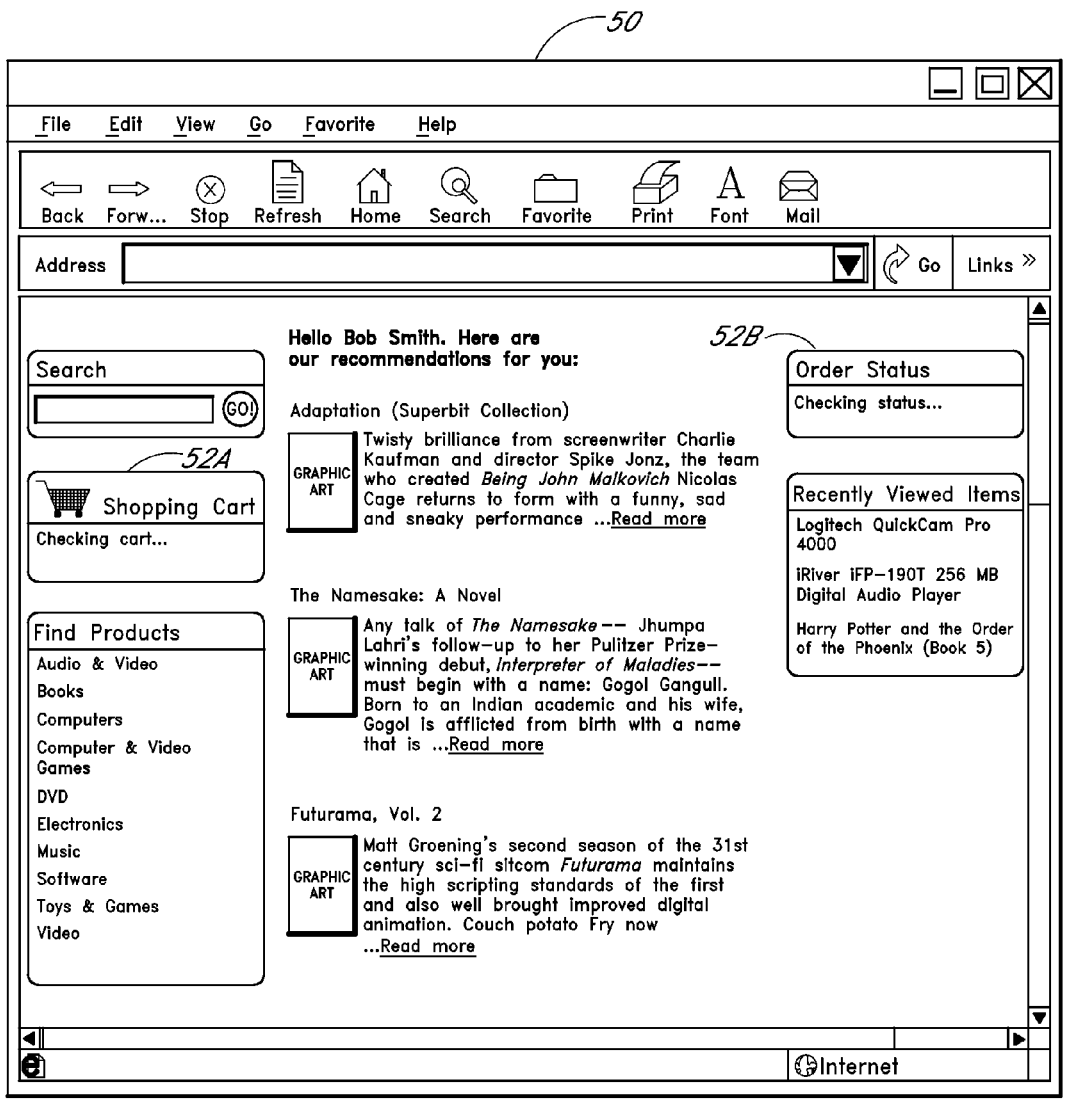
FIGS. 3A and 3B illustrate the initial and final display, respectively, of an example web page generated according to the process of FIG. 2.
Figure 3B:
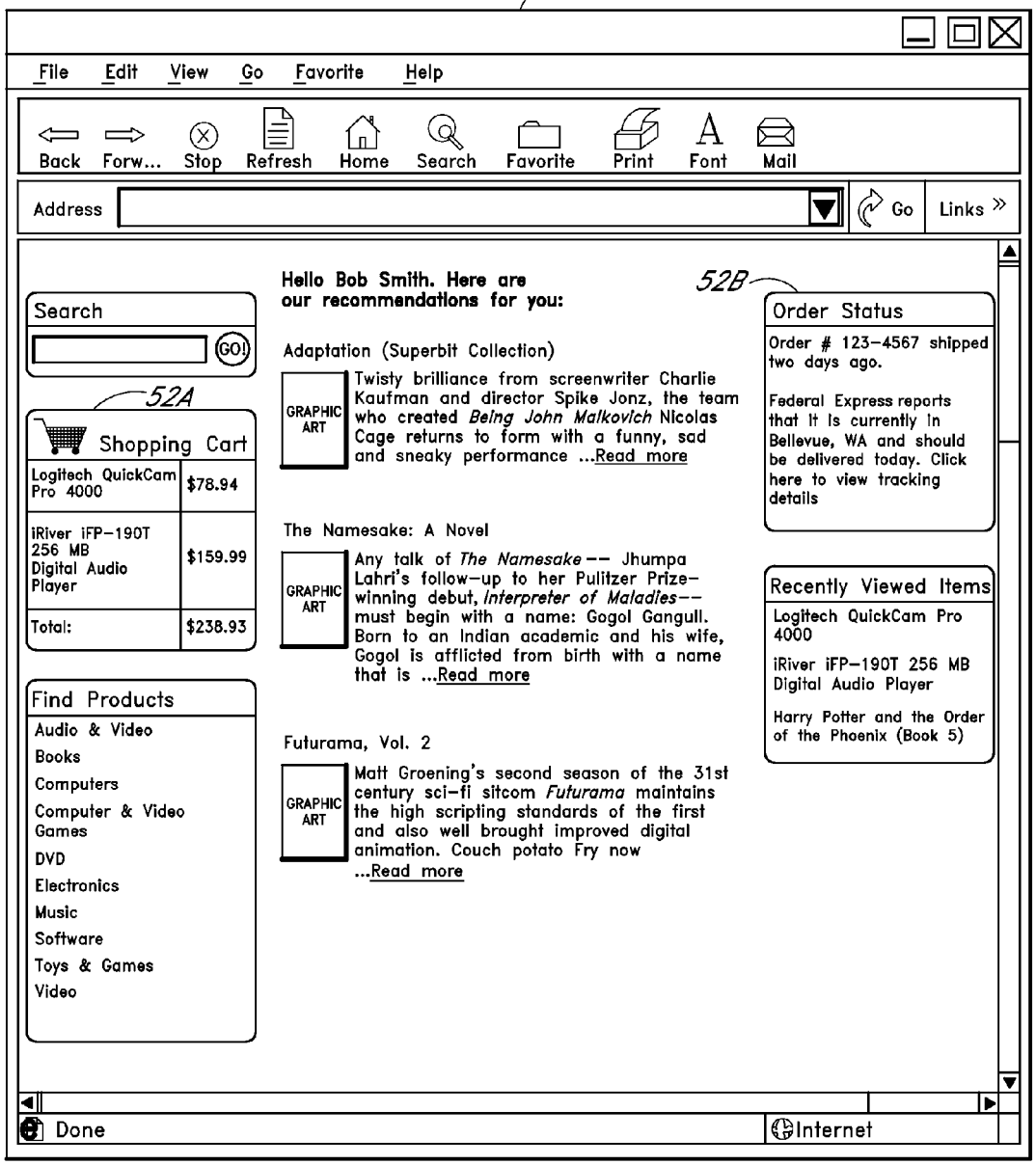

The page update handler 46 is preferably implemented within JavaScript code that is executed by the web browsers 28. ActiveX controls, Java controls, and other types of code modules that may be executed by or within a web browser 38 may alternatively be used. Although a single page update handler 46 is shown, many different page update handlers may be provided within a given system 40 to support a wide range of applications. Typically, a given page update handler 46 will correspond to particular type of display object (such as a shopping cart object or an order status object, as shown in FIGS. 3A and 3B), and may be used across many different web pages that display that display object.

The page update handler or handlers 46 may be transmitted to the web browsers 38 within the header portions of the web pages to which they correspond. For example, a given web page template 42 (which may correspond to many different possible web pages) may include a page update handler 46 as static content, causing the page update handler to be included within the header of any web page generated with that template. Preferably, however, the page update handler or handlers 46 are provided within one or more JavaScript libraries that may be separately downloaded and cached by the web browsers 38. With this approach, if a requested web page invokes a page update handler 46 that already resides in the web browser's cache, the web browser 38 need not retrieve the page update handler 46 from the web server 32. The page update handler and other program modules may be stored in non-transitory computer storage.

Figure 2:
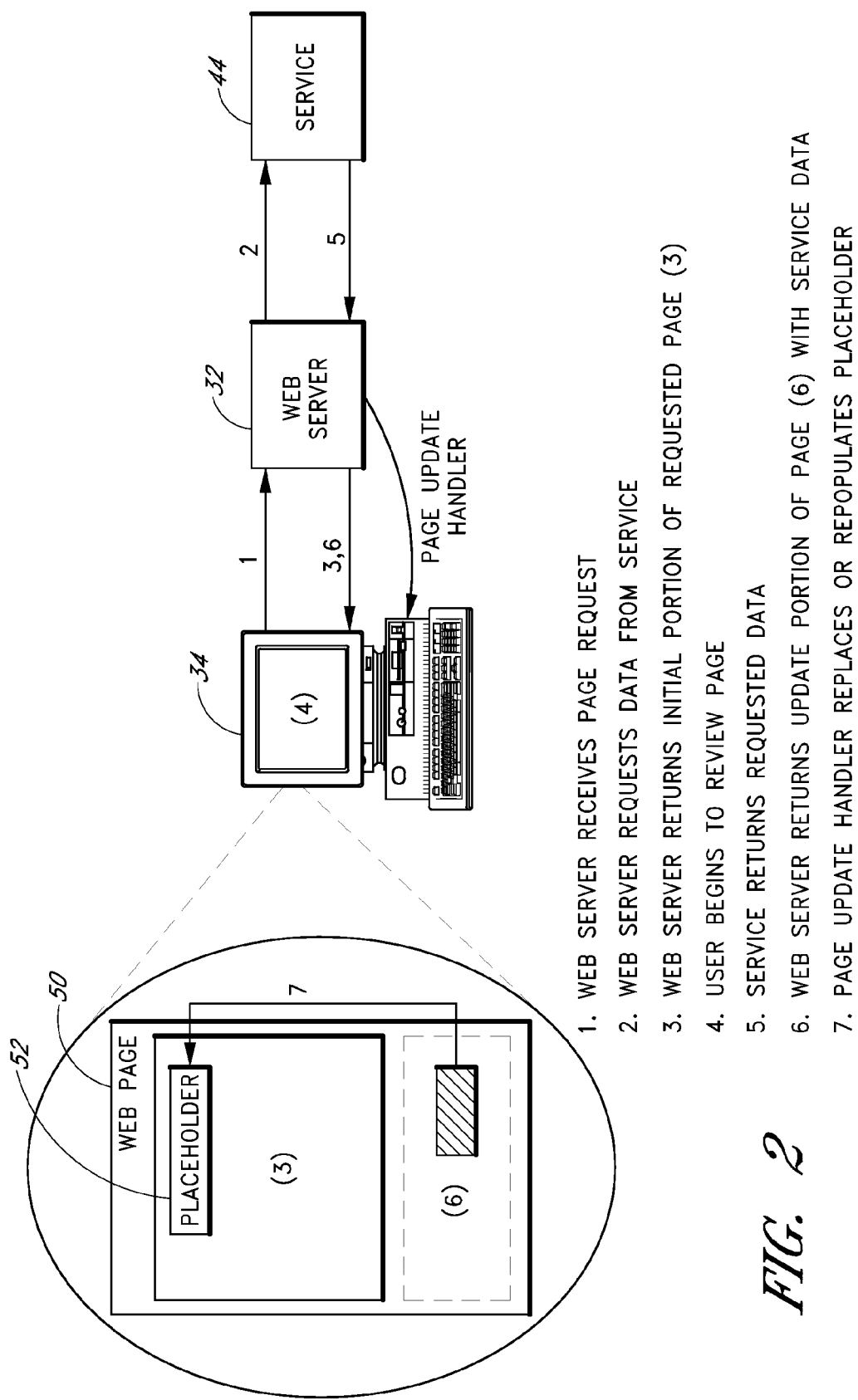
FIG. 2 illustrates a deferred-rendering page generation process according to one embodiment of the invention.

FIG. 2 illustrates a "deferred rendering" page generation process implemented by the system of FIG. 1 according to one embodiment of the invention. For purposes of illustration, only a single service 44 is shown (referred to as a "slow" service), and it is assumed that this service has a sufficiently long response time to justify use of the deferred rendering process. In practice, a given web page may be generated using data retrieved from several different services 44, some of which may have much longer response times than others.

In event 1, the server 32 initially receives a page request from a web browser 38 running on a user computer 34. In response to this request, the web server 32 sends a service request to the slow service 44 (event 2) to request data that will ultimately be incorporated into the web page. This service request may be fully specified by the associated template 42, in which case it may be issued substantially immediately upon receipt of the page request. In some cases, however, one or more parameters of this service request may be dependent upon the results of one or more other service requests, in which case the request to the slow service 44 may be postponed.

A "predictive prefetching" process of the type described in co-pending U.S. application Ser. No. 10/612,529, filed Jul. 2, 2003 (the disclosure of which is hereby incorporated by reference), may optionally be used to predict service requests that will be needed to generate the requested page, so that these service requests may be issued at the outset of the page generation task. As described in section IV below, predictive prefetching may also be used to deliver to the browser 34 service data associated with actions that may be performed by the user on the current page.

In event 3 (which may actually take place before or concurrently with event 2), the web server 32 generates and returns an initial portion (3) of the requested web page. This initial portion preferably includes a "placeholder" 52 that specifies the location at which the data from the slow service 44 will ultimately be displayed. The placeholder 52 may be in the form of a visible display object such as text box, an icon, or a graphic image, and may be displayed in conjunction with a message indicating that the associated data is being retrieved (see FIG. 3A, which displays two such messages). Alternatively, the placeholder 52 may be in the form of non-visible coding; such as a unique placeholder ID included within a hidden field.

The initial portion (3) of the web page includes the page's header. The header may include the page update handler 46, or if a library is used, a command to load the relevant library file that includes the relevant page update handler. The following is an example JavaScript sequence that may be included in the web page's header assuming a JavaScript library is used:

```
<script language="JavaScript1.2"
src="includes/scripts/asyncUpdate.js"></script>
```

The initial portion (3) of the web page also preferably includes most of the visible content of the web page 50. For example, the initial portion returned in event 3 may include all of the page's visible content except the data to be filled in by the page update handler 46. Thus, following event 3, the page preferably appears complete or substantially complete to the user, even though it has not finished loading. In event 4, the user begins to read the web page 50 as displayed by the browser 38.

In event 5, the slow service 44 returns the requested data (referred to herein as "late-arriving data") to the web server 32, which may appropriately format this data for display. As part of this process, the web server 32/dynamic page generator 36 may translate the service data into a user-readable form, filter out certain portions of the service data, and/or combine the service data with predefined or static content. The task of formatting the late-arriving service data for display may be offloaded in-whole or in-part to the page update handler 46. The page update handler 46 may also include logic for rearranging the page's layout to better accommodate the display of that data, as described below.

In event 6, the web server 32 returns an "update" portion (6) of the requested web page 50, which is the remaining portion of the page in the illustrated example. The update portion (6), which may be provided in a non-visible format, includes the late-arriving service data (as formatted by the web server 32), and preferably includes a function call to the page update handler 46. The late arriving service data may be included in the update portion (6) of the page as a hidden page element, such as a DIV or SPAN element. As described below, a command to invoke the page update handler 46 may alternatively be included earlier in the page. The transfer of the page update handler 46 to the browser 38 is depicted in FIG. 2 without a sequence number, as this transfer may occur at any time before event 7.

As a result of the function call, the browser 38 executes the page update handler 46, which copies or moves the service data from a non-visible location near the bottom of the web page to the placeholder location on the page (event 7). This may involve filling in a text box used as a placeholder (as in FIG. 3B), or by replacing a non-visible placeholder or a graphic image with the associated service data. As discussed below, the late-arriving service data may also be inserted in a manner in which it is displayed only as mouse-over text. Rather than transmitting the late-arriving data in a non-visible form, this data may be transferred in a visible form, but immediately moved to the placeholder location upon its arrival.

Typically, the page update handler 46 will also perform related rendering tasks such as incorporating the data into a tabular format (see box 52A in FIG. 3B), resizing the placeholder display object 52 based on the amount of data to be displayed, and/or selecting a display format that is the most suitable. For example, if the late-arriving data consists of three items to be displayed on the page, the page update handler 46 may decide to display the three items in the placeholder location across the page in a single row; if, on the other hand, the late arriving data includes four items, the page update handler 46 may decide to display these items in two rows of two items each.

In selecting the most suitable display format, the page update handler 46 may also take into consideration the current dimensions of the browser window on the user's computer 34. For example, if the user has contracted the browser window to less than the full width of the desktop, the page update handler 46 may select a display format that will allow most of all of the items to be viewable within this window. In general, this type of selective formatting cannot be performed by the web server 32, as the web server has no way of knowing the current dimensions of the browser window.

To reduce the quantity of data transmitted from the web server 32 to the web browser 38, the late-arriving service data may optionally be sent to the web browser 38 in event 6 in a highly compact or compressed format. The page update handler 46 may then appropriately expand this data as needed to display the data on the web page. For example, the late-arriving service data may be sent to the browser 38 with little or no HTML coding, and with URLs represented in a compact form. The page update handler 46 may then add the appropriate HTML coding, and expand the URLs, so as to appropriately display the data on the page. Typically, the quantity of transmitted data can be reduced by approximately 75% by using this approach. In addition to reducing download times, this approach will typically reduce the load on the web server 32 by allowing the web server to omit certain formatting tasks.

In the example shown in FIG. 2, the web page is fully loaded once the update portion (6) has been received and processed by the browser 38.

As described above, the command to invoke the page update handler 46 is preferably transmitted to the browser 38 with or just after the late-arriving service data. As an alternative, the JavaScript OnLoad command may be used, in which case the page update handler 46 will be executed once the page finishes loading. If the OnLoad command is used, the service data is preferably initially written to the bottom of the web page 50 in a non-visible form. The page generation sequence is the same as in FIG. 2, except that there is no direct call to the page update handler 46. Instead, the page update handler 46 is called only as part of the OnLoad processing, which occurs after event 6 and after all other elements of the page have been loaded.

The following is an example JavaScript sequence which uses the OnLoad command to invoke the page update handler 46. This sequence may be included in the initial web page portion (3) served in step 3.

```
<body OnLoad="initEverything( ); invokeAsyncUpdate( );">
```

In scenarios in which the slow service's response time is on the order of several seconds, the process depicted in FIG. 2 significantly improves the page's load time as perceived by end users, without the need to display the late-arriving service data at a low-prominence location on the page. Specifically, because the web server 32 can typically render the initial portion (3) of the web page within a few hundred milliseconds of receiving the page request, the page appears substantially complete almost immediately (assuming network latency and bandwidth constraints are negligible), despite the substantial time required to obtain the requested data from the slow service 44. Once the late-arriving service data becomes available, it may be displayed in a prominent location, such as within the upper third or upper quarter of the visible page, above other content that has already been displayed.

Another benefit of the deferred-rendering page generation process is that the load of the web server 32 is reduced by offloading certain page rendering tasks from the web server 32 to the web browsers 32. As a result, the web server may be able to server a greater number of pages per unit of time.

In scenarios in which a given page request invokes multiple slow services 44, the process shown in FIG. 2 may be augmented so that multiple placeholders 52 are included in the initial portion (3) of the web page (one for each slow service 44), and such that events 2 and 5-7 occur separately for each such service. In such cases, the page updates may occur asynchronously to each other since any one of the slow services 44 may return its data before any other slow service. An example web page that includes two placeholders is shown in FIGS. 3A and 3B.

The page generation process of FIG. 2 may be used whenever a particular URL is requested, or whenever a particular web page template is used to generate a web page. Alternatively, the dynamic page generator 36 may include decision logic for deciding, at page generation time, whether or not to use the deferred rendering process to generate a requested page. This decision logic may base its decision on some or all of the following factors, as well as others:

(a) the average response time of the relevant service 44 over a period of time, such as the last ten minutes;
(b) the amount of time the relevant service request has been pending (e.g., a placeholder may be inserted for a given service request if that request has been pending for more than a threshold amount of time);
(c) the current load level of the relevant service 44;
(d) the bandwidth of the user's connection;
(e) the current load on the web server 32 (note that this load may be reduced by using the deferred-rendering process, as described above);
(f) whether the browser 38 supports JavaScript or has JavaScript enabled;
(g) whether the user has disabled deferred-rendering browsing through a configuration page of the web site.

Figure 5:
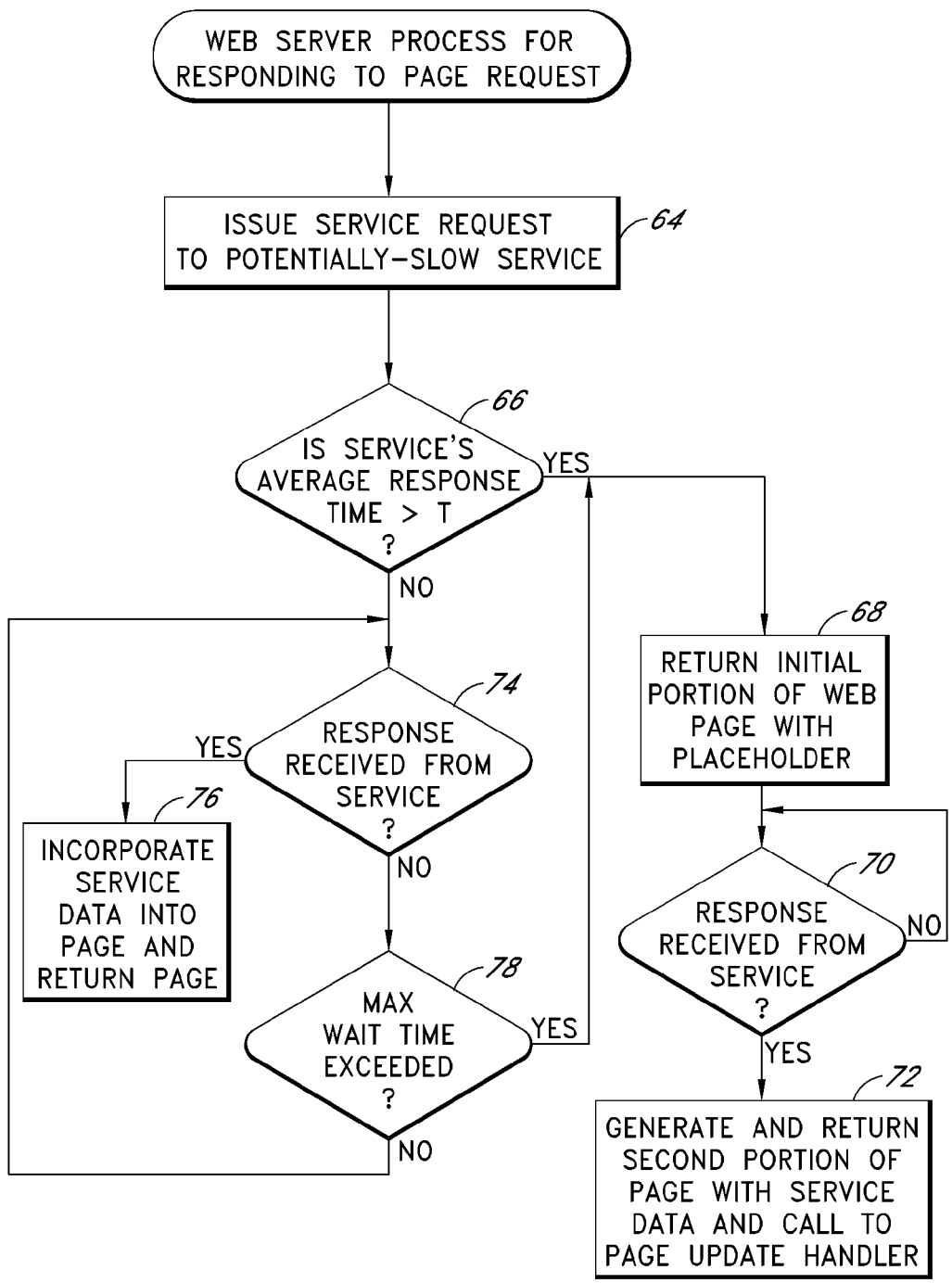
FIG. 5 illustrates an embodiment in which a decision of whether to use the deferred-rendering page generation process is made based upon information about the historical and actual response time of the relevant service.

An example process that takes factors (a) and (b) into consideration is shown in FIG. 5, and is discussed separately below.

In practice, the web page designer will typically know which services 44 are the most likely to have the longest response times. Consequently, the designer will typically write page update handlers 46 only for some services and associated display objects, and not others.

The flow diagram of FIG. 2 does not depict the retrieval by the browser 38 of any inline objects, such as image files, that may be included in the web page. If any such objects are included on the page, their retrieval by the browser 38 will occur asynchronously relative to the updating of the page in step 7. Thus, a given image file may first appear on the page before, during, or after the page is updated with data from the slow service 44. If, however, the OnLoad command is used to invoke the page update handler 46, the page will not be updated with the late-arriving service data until all inline objects have been loaded.

II. Example Screen Displays and Applications

FIGS. 3A and 3B illustrate an example in which the general process of FIG. 2 is used to update a web page 50 with data returned by a shopping cart service 44 and an order status service 44 in the context of a retail sales web site. In this example, the shopping cart service 44 returns the current contents of a shopping cart for a given user ID, and the order status service 44 returns the status of any pending orders for a given user ID. As depicted in FIG. 3A, the page 50 is initially displayed with placeholder display objects (text boxes) 52A, 52B for each of these services. Each such text box is initially populated with a status message indicating that the associated status is being checked. Although the web page 50 is not finished loading at this point, the majority of the page's visible content is displayed. The catalog content shown in the page in this example is generated using a recommendations service 44 the returns personalized recommendations of catalog items, and a catalog service 44 that returns associated descriptions of these items.

FIG. 3B illustrates the fully loaded and rendered web page 50, with the shopping cart and order status text boxes 52A, 52B repopulated with corresponding service data. Each such box 52 may be repopulated by a different respective page update handler 46, although a single page update handler 46 may alternatively be used to fill in both text boxes 52A, 52B. In either case, the late-arriving service data is initially included at the end of the page (preferably in a hidden format), and is copied or moved to the associated text boxes by the page update handler code.

Shopping cart and order status boxes 52A, 52B of the type shown in FIGS. 3A and 3B may be included throughout various pages of the web site, such as the site's home page, product detail pages, recommendations pages, and browse node pages. This may be accomplished by including similar JavaScript code within each of these pages to invoke the associated page update handler(s) 46. If the page update handlers 46 are provided as part of a library file (in which case they may be cached by the browser 38, as described above), they need not be downloaded by the browser 38 each time such a web page is displayed.

One possible variation is to replace the shopping cart text box 52A in FIGS. 3A and 3B with a shopping cart graphic that includes associated mouse-over text. With this approach, if the user hovers the mouse cursor over the shopping cart graphic before the shopping cart service data arrives at the browser 38, a message such as "checking cart" or "loading" may be displayed. Once the shopping cart data has arrived, this mouse-over message may be replaced with the actual shopping cart contents in mouse-over form. The same approach can be used to display the order status data.

Figure 4A:
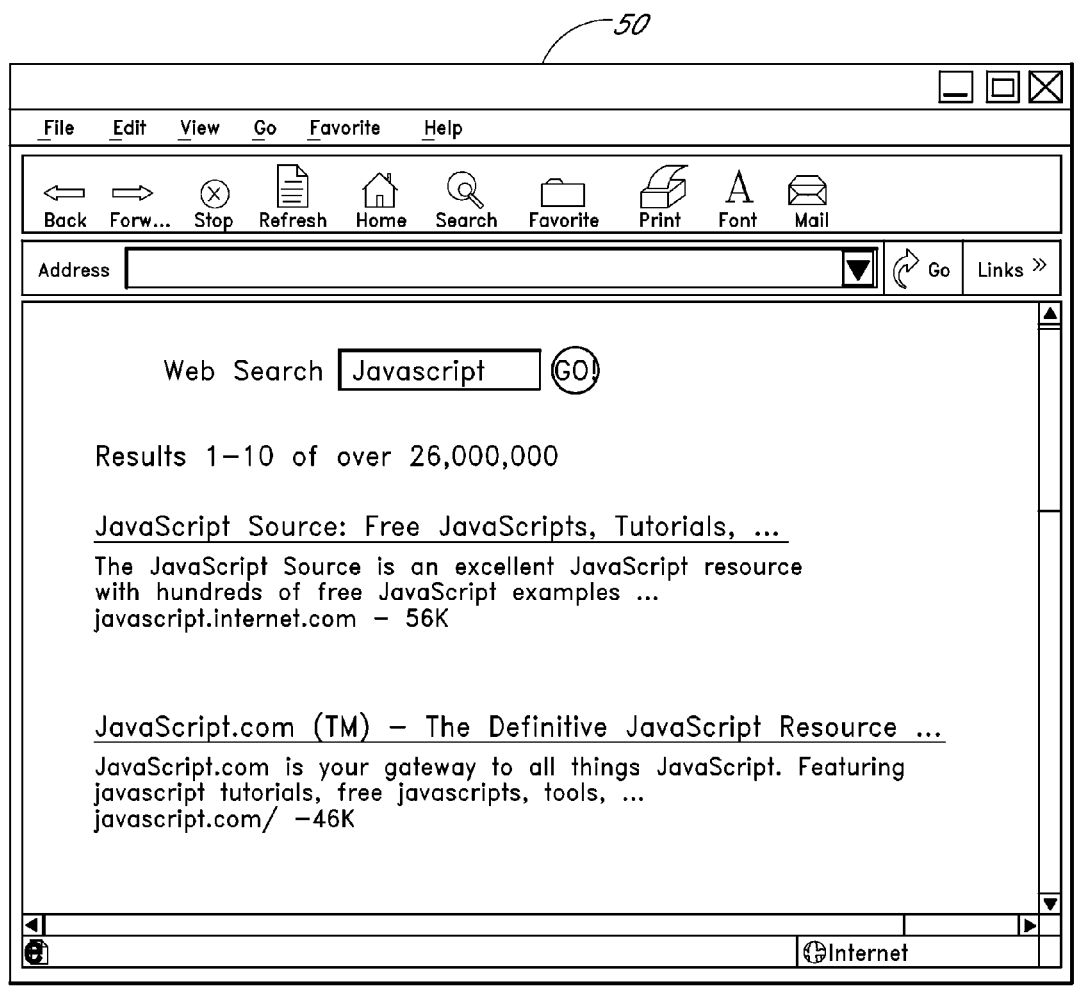
FIGS. 4A and 4B illustrate the initial and final display, respectively, of another example web page generated according to the process of FIG. 2.
Figure 4B:
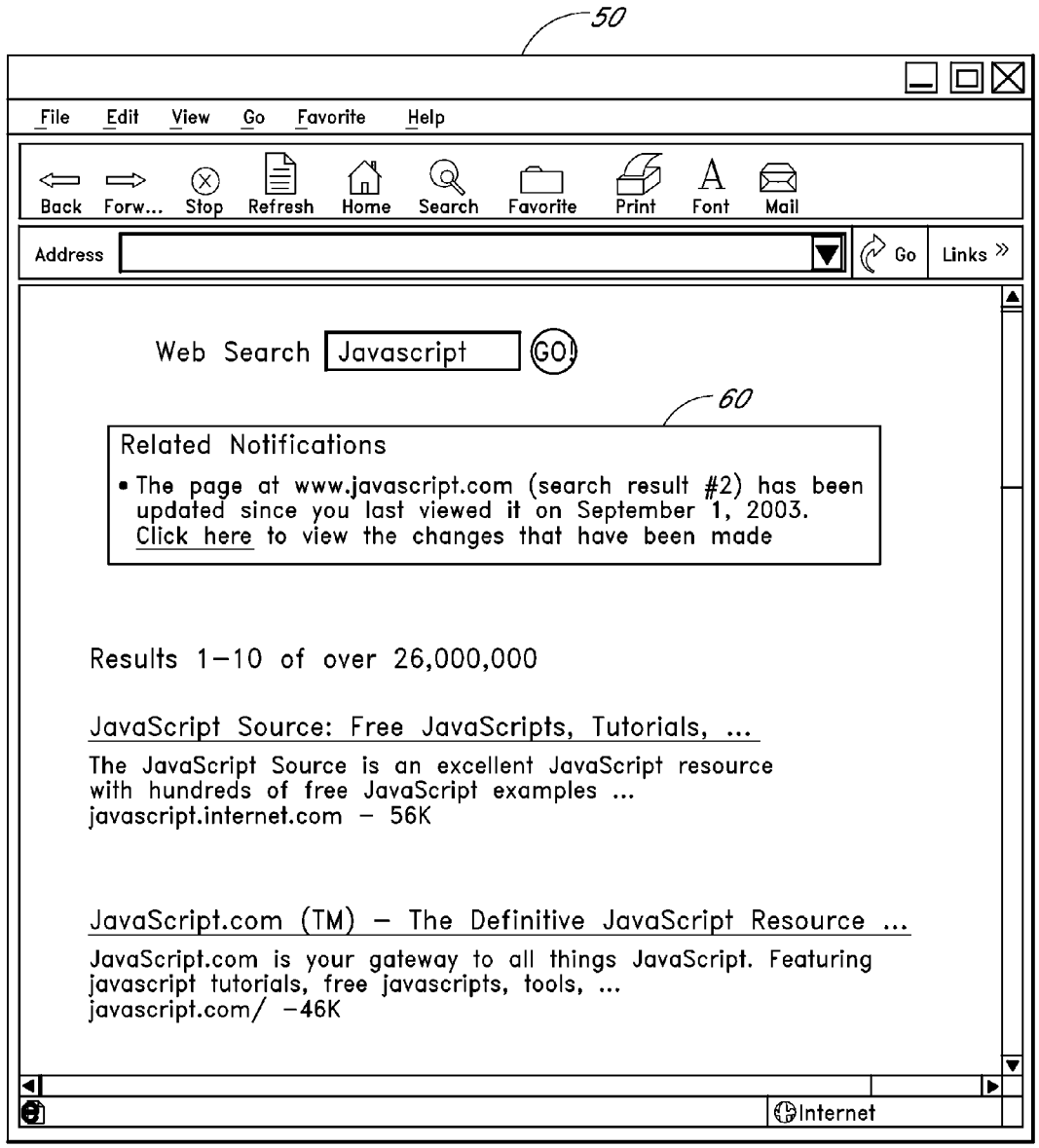

FIGS. 4A and 4B illustrate another example in which the deferred rendering process is used to update web search results pages with "related notifications." These related notifications may be generated through the use of two services 44: an event history service that maintains a history of the web pages accessed by each user of the web site system 30, and a web page tracking service that tracks changes that have been made to web pages over time. The event history service may be implemented as described in U.S. patent application Ser. No. 10/612,395, filed on Jul. 2, 2003, the disclosure of which is hereby incorporated by reference. The web page tracking service may be implemented generally as described in U.S. Pat. Nos. 6,249,795 and 6,596,030.

The task of generating a search results page of the type shown in FIGS. 4A and 4B generally involves three phases. During the first phase, the user's search query is used to identify up to ten search result items (web pages) that are to be listed on the search results page. At the end of the first phase, the initial portion of the search results page 50 is transmitted to the user's computer with the search result listing (see FIG. 4A, which only shows the first two of ten displayed search result items), but without the related notifications section shown in FIG. 4B. A non-visible placeholder code or object is included in the page's coding in this example to mark the location at which the related notifications box 60 will be added. A visible display object may alternatively be used, as in the prior example.

During the second phase of the page generation process, the dynamic page generator 36 (FIG. 1) sends a service request to the event history service 44 with a list of the search result items (URLs) displayed on the page and the user's ID. The event history service 44 responds to this request by determining, from the user's event history, whether the user has previously accessed any of these URLs. If the user is found to have previously accessed one or more of the URLs, the event history service returns the date and time of the user's last access to each such URL.

If the event history service 44 returns an indication that none of the search result URLs were found in the user's browse history, the web server 32 may simply transmit the end of the page without invoking a page update, and without performing the third phase. In this event, the display of the page may remain unchanged from FIG. 4A. Alternatively, the web server 32 may send to the browser 38 a page update sequence that causes the browser 38 to display default content in the related notifications area 60.

During the third phase (if needed), the web server 32 sends a request to the web page tracking service 44 with a list of the search result URLs that were previously accessed by the user together with associated timestamps indicating the date and time of each such access. For each such URL, the web page tracking service 44 returns an indication of whether the corresponding web page has been modified since the user's last access. At the end of this phase, the dynamic page generator 36 formulates a related notifications message of the type shown in FIG. 4B, identifying the page or pages that have been previously viewed and indicating whether each such page has changed. This notification message is returned to the browser 38 along with a command that invokes an associated page update handler 46, which renders the related notifications box 60 with the notification message displayed therein. Each notification may alternatively be inserted at the end of the corresponding search result item description.

Another application for the deferred rendering process is to add new items to a list of items displayed on the initial portion or version of a web page. For example, a web page that displays personalized recommendations of items may initially be rendered with a short list of recommended items that are readily identifiable. As additional recommended items are identified and passed to the web browser over time, the page update handler 46 may add these items to the list. The list may optionally be provided as a drop-down list, or as a scrollable list, so that the addition of the new items does not affect the display locations of other visual elements on the page.

FIG. 5 illustrates one example of a page generation process in which two factors are taken into consideration in deciding whether to defer rendering of a web page section associated with a potentially-slow service 44: (a) the service's average response time, and (b) the actual elapsed time since the associated service request was sent. This process may be executed by the dynamic page generator 36 (FIG. 1) whenever a particular web page or type of web page is requested. As depicted by block 64, the dynamic page generator 36 initially responds to the page request by sending a service request to the potentially-slow service 44.

As indicated by block 66, the dynamic page generator 36 also performs a look-up operation to determine the average response time of the potentially-slow service 44 over some period of time, such as the last ten minutes. Data regarding the service's average response time may be generated by the dynamic page generator 36, or by a separate monitoring component (not shown) that monitors the response times of various services within the system. This monitoring component may, but need not, run on the web server machine 32. The look-up operation performed in block 66 may be specific to one of a number of different types of service requests handled by the potentially-slow-service 44, since different types of requests may have very different average response times.

If the service's average response time exceeds a predefined threshold T (e.g., three seconds), the page is generated according to the deferred rendering process of FIG. 2. Specifically, the web server 32 returns an initial portion of the web page with a placeholder for the potentially late-arriving service data (block 68). When the service data is thereafter received from the service 44 (block 70), the web server 32 generates and returns a second portion of the web page with the relevant service data and a call to the page update handler (block 72).

If the potentially-slow service's average response time does not exceed the predefined threshold in block 66, the web server 32 waits for the requested service data to arrive. As depicted by blocks 74-78, if this data arrives within a maximum wait time (e.g., five seconds), the data is incorporated into the web page without using the page update process (i.e., the page is served in a fully-rendered form). If, on the other hand, the maximum wait time is exceeded, the deferred rendering process of blocks 68-72 is invoked. As will be apparent, numerous other conditions may be incorporated into the process in FIG. 5, including those listed above.

As illustrated by the examples in FIGS. 3A/3B and 4B/4B, the page updating process allows important data retrieved from one or more relatively slow services 44 to be presented near the top of the web page 50, without delaying the display of the remainder of the page. Although some or all of the late-arriving service data is preferably displayed near the top of the page, it may be inserted elsewhere on the page, such as in association with other visual items to which such service data corresponds.

The screen displays shown in FIGS. 3A/3B and 4B/4B represent two possible applications of the deferred rendering feature. Other possible applications include the following:

Display of current inventory on catalog pages: When a user accesses a product detail page for a particular product within an online merchant's catalog, the page may be updated by a page update hander 46 to indicate the number of units that are currently in stock, as indicated by an inventory service.

Display of Book Finder service data on catalog pages: When a user accesses a book detail page, the page may be updated by a page update hander 46 to display, for each library within a given geographic region of the user, an indication of whether the associated book is available at that library, and when the book is due back if on loan Enhanced schedules on travel web sites: When a user accesses page that shows a schedule for a given bus, train, airplane, or ferry route, the late-rendered data added by the page update hander 46 shows whether any currently on-route vehicles are on schedule or not.

Ancillary travel information: On an airline or other travel site, when a user accesses a page displaying scheduled flights to a given city on a given date, the page may be updated with late-arriving data regarding number of seats available on each flight. The page may also be updated with data regarding vacancies at local hotels, highlighting any specific hotel or chain used by the user in the past.

III. Use of Secondary Page in Hidden Window

As an alternative to including the late-arriving service data at the end of the web page, the late arriving data may be transmitted to the web browser 38 as part of a secondary web page that is loaded within a hidden window of the web browser. With this approach, two different methods may be used to update the main (visible) page 50 with the late-arriving service data. The first method involves transmitting the late-arriving data together with code which, when executed within the secondary page, calls a page update handler 46 on the main page 50, and passes the late-arriving data to this page update handler. The page update handler 46 may otherwise operate generally as described above. The second method involves including within the main page 50 a page update handler 46 that polls the hidden window for the late-arriving data. Once this data arrives, the page update handler copies or moves the data to the placeholder location(s) on the main page 50. With both of these approaches, the late-arriving service data may begin to arrive at the browser 38 after the main page 50 has finished loading.

IV. Predictive Prefetching

As mentioned above, a "predictive prefetching" process of the type described in co-pending U.S. application Ser. No. 10/612,529, filed Jul. 2, 2003, may optionally be used within the system of FIG. 1 to preemptively generate, at or near the outset of a page generation event, those service requests that are deemed likely to be needed to generate the requested web page. For example, a service request that would ordinarily be generated a few seconds after the web server 32 receives the page request (due to blocking caused by service request dependencies, etc.) may instead be generated right when the page request is received. As a result, the requested service data will arrive at the web server 32, and can be delivered to the web browser 38, sooner than would otherwise be the case. This "prefetched" service data may either be incorporated into the web page as initially rendered (as described in the '529 application), or added to the web page using a page update handler 46.

One variation to this approach is to "predict" subsequent actions that will be performed by the user during viewing of a current web page (and particularly those that cause the current page to be updated), and then preemptively generate some or all of the service requests associated with such actions. The resulting "prefetched" service data may then be downloaded to the user's browser 38 in a hidden format—either in the current page, or in a secondary page within a hidden window as described above. The data associated with a number of different possible user actions may be downloaded to the browser 38 in this manner, without necessarily attempting to predict whether these actions are likely to be performed by the user.

If the user thereafter performs an action for which the associated service data has been prefetched and preloaded, a page update handler 46 may be invoked to update the current page with the preloaded service data. With this approach, the update to the web page occurs instantaneously from the user's perspective as the associated user action is performed. Another benefit is that this update occurs without the need to send a subsequent request to the web server 32. A decision of whether to prefetch and preload the service data may be made at the time of the page request based on previously-performed analysis of past browsing histories of users (e.g., do most users perform the action when they view this page?), an analysis of this particular user's prior browsing activities (e.g., has this user frequently performed this or similar actions in the past?), and/or other factors such as those listed above in subsection I.

By way of example, a web page may initially be displayed with a link that reads "view our product recommendations for you." As or shortly after this page is transmitted to the user's browser, the web server 32 may request these recommendations from a recommendations service 44, and deliver the resulting product recommendations data to the browser 38 in a hidden format. When the user thereafter selects the link, a page update handler 46 may be invoked, as described in the previous subsections, to add the preloaded product recommendations data to the displayed page. A decision of whether to preload the recommendations data in this manner may be made on a user-by-user basis based, for example, on a frequency with which the given user has selected the "view our product recommendations for you" link in the past.

As another example, the user's most recent browsing actions may be used to predict whether the user is likely to select a particular link. For instance, if the user has already clicked on the first three items in a list displayed on a current page, an assumption may be made that the user will likely select the fourth item in this list. Based on this assumption, the web server 32 may preemptively obtain and forward to the browser 38 the data associated with the fourth list item without waiting for the user to select the fourth item.

Although this invention has been described in terms of certain preferred embodiments and applications, other embodiments and applications that are apparent to those of ordinary skill in the art, including embodiments which do not provide all of the features and advantages set forth herein, are also within the scope of this invention. For example, the processes described herein may also be applied to other applications and scenarios in which readily-available data is displayed together with non-readily-available data that must be retrieved. Accordingly, the scope of the present invention is defined only by the appended claims.

What is claimed is:

1. A method of generating web pages, comprising:

by a server, receiving a page request from a web browser, and responding to the page request by (1) detecting a delay condition in which retrieval by the server, from a service, of service data for generating a requested web page is delayed, and (2) in response to detecting the delay condition, generating, and transmitting to the web browser, a deferred rendering version of the web page, the deferred rendering version including a placeholder for the service data;

by the server, transmitting a page update handler to the web browser, said page update handler being executable by the web browser and including functionality for updating the deferred rendering version of the web page; and by the server, retrieving the service data from the service, generating an update that includes the retrieved service data in a hidden format, and transmitting the update to the web browser;

wherein the deferred rendering version of the web page, as displayed by the web browser prior to the web browser receiving the update, includes a rendered portion that does not include a representation of the service data, and wherein the web browser is responsive to the update by executing the page update handler which updates the rendered portion of the web page with a representation of the service data at a page location corresponding to the placeholder, wherein the page update handler selects a display format with which to integrate the service data into the web page based at least partly on a quantity of the service data, wherein the update to the rendered portion is made at least partly by adding markup language coding to the deferred rendering version of the web page.

2. The method of claim 1, wherein the delay condition is a condition in which an average response time of the service exceeds a threshold.

3. The method of claim 1, wherein the delay condition is a condition in which a request to the service for the service data has been pending for a threshold amount of time.

4. The method of claim 1, wherein the page update handler selects the display format with which to integrate the service data into the web page based additionally on a size of a browser window in which the web page is displayed.

5. The method of claim 1, wherein detecting the delay condition comprises applying decision logic that checks for a plurality of conditions that can each delay retrieval of the service data from the service.

6. The method of claim 1, wherein detecting the delay condition comprises determining a load level of the service.

7. The method of claim 1, wherein the server transmits the page update handler to the web browser as part of the deferred rendering version of the web page.

8. The method of claim 1, wherein the server transmits the page update handler to the web browser as a library file, separately from the deferred rendering version of the web page.

9. A server system comprising one or more physical servers, said server system programmed with executable program code to respond to a request from a user device for a content page by a process that comprises:
   transmitting a request to a service for service data for generating the content page;
   detecting a delay or predicted delay in retrieval by the server of the service data from the service;
   in response to detecting the delay or predicted delay, generating, and transmitting to the user device, a deferred rendering version of the content page, said deferred rendering version omitting the service data and being configured to be updated on the user device with a visual representation of the service data;
   transmitting a page update handler to the user device; and
   subsequently, generating, and transmitting to the user device, an update that includes the service data, said update including a command that causes a browser running on the user device to execute the page update handler, wherein the page update handler, when executed by the browser, adds the visual representation of the service data to the deferred rendering version of the content page as rendered on the user device, wherein the page update handler is configured to select a display format with which to integrate the service data into the deferred rendering version of the content page based at least partly on a quantity of the service data.

10. The server system of claim 9, wherein the deferred rendering version of the content page includes a placeholder for the service data.

11. The server system of claim 9, wherein detecting the delay or predicted delay comprises determining an average response time of the service.

12. The server system of claim 9, wherein detecting the delay or predicted delay comprises determining a load level of the service.

13. The server system of claim 9, wherein detecting the delay or predicted delay comprises determining that the request for the service data has been pending for a threshold amount of time.

14. The server system of claim 9, wherein the page update handler comprises Javascript code that, when executed by the browser running on the user device, adds Hypertext Markup Language coding to the deferred rendering version of the content page.

15. The server system of claim 9, wherein the server transmits the page update handler to the user device as part of the deferred rendering version of the content page.

16. The server system of claim 9, wherein the server transmits the page update handler to the user device as a library file.

17. A server system comprising one or more physical servers, said server system programmed with executable program code to respond to a page request from a user device for a content page by a process that comprises:
   transmitting a request to a service for service data for generating the content page;
   determining whether to send to the user device a deferred rendering version of the content page in which the service data is omitted, wherein determining whether to send the deferred rendering version comprises determining at least one of the following: (1) an average response time of the service, (2) a current load level of the service, (3) an amount of time the request for the service data has been pending;
   in response to a determination to send the deferred rendering version of the content page, generating, and sending to the user device, the deferred rendering version;
   transmitting a page update handler to the user device; and
   subsequently, generating, and transmitting to the user device, an update that includes the service data, said update including a command that causes a browser running on the user device to execute the page update handler, wherein the page update handler, when executed by the browser, adds a visual representation of the service data to the deferred rendering version of the content page as rendered on the user device, wherein the page update handler is configured to select a display format with which to integrate the service data into the deferred rendering version of the content page based at least partly on a quantity of the service data.

18. The server system of claim 17, wherein determining whether to send to the user device a deferred rendering version of the content page comprises determining an average response time of the service.

19. The server system of claim 17, wherein determining whether to send to the user device a deferred rendering version of the content page comprises determining a current load level of the service.

20. The server system of claim 17, wherein determining whether to send to the user device a deferred rendering version of the content page comprises determining an amount of time the request for the service data has been pending.

21. The server system of claim 17, wherein determining whether to send to the user device a deferred rendering version of the content page further comprises determining a current load level of the server system.

22. The server system of claim 17, wherein the page update handler is configured to select, based on the quantity of the service data, a number of rows to add to the deferred rendering version of the content page to display the service data.

* * * * *